(12) United States Patent
Park

(10) Patent No.: US 6,384,749 B1
(45) Date of Patent: May 7, 2002

(54) DIGITAL VIDEO CODING METHOD AND DEVICE

(75) Inventor: Jeong-hoon Park, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/541,003

(22) Filed: Mar. 31, 2000

(30) Foreign Application Priority Data

Oct. 19, 1999 (KR) .......................................... 99-45314

(51) Int. Cl.[7] .............................................. H03M 13/00
(52) U.S. Cl. ...................... 341/94; 341/50; 375/240.12; 386/81
(58) Field of Search ................ 341/94, 50; 375/240.18, 375/240.16; 386/81, 124, 111, 68, 112; 348/699

(56) References Cited

U.S. PATENT DOCUMENTS 5,008,747 A * 4/1991 Carr et al. ............. 375/240.12
5,008,748 A * 4/1991 Carr et al. ............. 375/240.12
5,995,707 A * 11/1999 Lee .............................. 386/81

* cited by examiner

Primary Examiner—Peguy JeanPierre
Assistant Examiner—Jean Bruner JeanGlaude
(74) Attorney, Agent, or Firm—Sughrue Mion, PLLC

(57) ABSTRACT

A digital video coding method for encoding video frames and outputting a bit stream including picture headers is provided. The digital video coding method includes the steps of identifying what is changed in a coding type between a previous frame and a current frame, and performing a predetermined bitwise logical operation with respect to a value of an indicator field of the previous frame and a bit value, wherein the bit value is determined according to the kind of change in a coding type which is identified in the above step and the indicator field is a predetermined field for indicating whether the coding type has been changed, and determining a result value of the logical operation as a value of an indicator field of the current frame. In the digital video coding method, when encoding a current frame, a value of a group of block frame identifier (GFID) field of the current frame is determined by performing a bitwise logical operation with respect to a value of a GFID field of a previous frame and a bit value representing information on the kind of change in a coding type, and the determined value is embedded in the current frame. Therefore, even if a picture header of a current picture frame is lost, the kind of change in a coding type can be estimated based on the values of GFID fields of the current and previous frames during decoding. Consequently, decoding can be performed using accurate picture header information.

20 Claims, 5 Drawing Sheets

DIGITAL VIDEO CODING METHOD AND DEVICE

BACKGROUND OF THE INVENTION

1. Field of the Invention

The present invention relates to a digital video coding method, and more particularly, to a digital video coding method for allowing decoding to be normally performed even if a picture header, which is significant to decoding of an encoded bit stream, is lost. The present invention also relates to a digital video decoding method for decoding a bit stream which has been encoded by the encoding method. The present invention further relates to a digital video coding device and a digital video decoding device for performing the encoding method and the decoding method, respectively. This application is based on Korean Patent Application No. 99-45314 which is incorporated herein.

2. Description of the Related Art

In this specification, an H.263 standard is used as an example for explaining a conventional digital video encoding method. FIG. 1 shows the format of a field defined by the H.263 standard to explain a conventional video coding method. Referring to FIG. 1, a video bit stream which has been encoded according to the H.263 standard is composed of a plurality of picture frames. A first picture frame 1 is composed of a plurality of groups of blocks (GOBs) including a first group of blocks GOB0 and a second group of blocks GOB1. The first group of blocks GOB0 includes a picture frame start, a picture header, a GOB frame identifier (GFID) and a plurality of macroblock (MB) data. The second group of blocks GOB1 includes a GOB header, a GFID and a plurality of MB data. The second picture frame 2 and other plurality of picture frames (not shown) have the same structure as that of the first picture frame 1.

According to the H.263 standard, as a coding type changes, a field value of the GFID changes. Moreover, according to the H.263 standard, the GFID field is composed of 2 bits, and, when a part of the picture header or the entire picture header changes, a value of the GFID field of a previous frame and a value of the GFID field of a current frame are assumed to be set to different values. However, specific values that the GFID fields must be set to are not defined in the H.263 standard. In addition, according to the H.263 standard, an update full extended picture type (UFEP) field is set to "001" only when a corresponding picture frame includes a GFID field whose value changes. When the UFEP field is set to "001", it is determined during decoding that the coding information on the corresponding picture frame has been changed.

However, according to the above conventional method, when a bit stream, which has been coded by the digital video coding method according to the H.263 standard, undergoes an error or loss under a transmission environment in which a bit error or packet loss can occur, a picture header may not be decoded. In this case, a problem may occur. In other words, it may not be recognized which picture coding information must be used for decoding a current picture frame in a decoding apparatus. In this situation, according to the conventional decoding method, a bit stream is discarded and decoding is not performed until the start of a next picture frame is found, or decoding is performed using previous picture coding information.

When discarding a bit stream until the start of a next picture frame is found and restarting decoding from the start of the found next picture frame, picture quality is seriously deteriorated. Alternately, when decoding is performed using previous picture coding information, a problem may occur if a different coding method is used for a current frame than a previous frame. Moreover, according to the conventional coding method, if the picture header information of a frame is lost when decoding a frame including an UFEP field which is set to "001", it may happen that frames cannot be normally decoded until a frame including a new change is found.

SUMMARY OF THE INVENTION

To solve the above problems, it is an objective of the present invention to provide a digital video coding method for allowing the decoding of a picture frame using accurate picture header information by estimating the change in a coding type using a value of a group-of-block frame identifier (GFID) even if the picture header of the corresponding picture frame is lost.

It is another objective of the present invention to provide a digital video decoding method for decoding a bit stream which has been coded by the digital video coding method.

It is yet another objective of the present invention to provide a digital video coding device for performing the digital video coding method.

It is still yet another objective of the present invention to provide a digital video decoding device for performing the digital video decoding method.

Accordingly, to achieve the above objective, there is provided a digital video coding method including the steps of: (a) identifying what is changed in a coding type between a previous frame and a current frame; and (b) performing a predetermined bitwise logical operation with respect to a value of an indicator field of the previous frame and a bit value, wherein the bit value is determined according to the kind of change in a coding type which is identified in the step (a) and the indicator field is a predetermined field for indicating whether the coding type has been changed, and determining a result value of the logical operation as a value of an indicator field of the current frame.

Preferably, the indicator field is a group-of-block frame identifier (GFID) field which is defined by an H.263 standard, and the bitwise logical operation is an exclusive OR operation.

Preferably, the bit value has a different value according to a first case in which a rounding type changes, a second case in which an 5intra frame is changed into an inter frame or an inter frame is changed into an intra frame, and a third case in which a coding type change other than the former two cases occurs. The third case includes a change in an annex which is a detailed appendix defining an optional coding method in view of a digital video coding related standard.

Preferably, the digital video coding method also includes setting update full extended picture type (UFEP) fields, which are defined by an H.263 standard, to "001", with respect to the current frame, in which the change in a coding type occurs, and a next frame, when the change in the coding type falls under the third case.

To achieve another objective, there is provided a digital video decoding method including the steps of comparing an indicator field of a previous frame and an indicator field of a current frame in the input bit stream, each indicator field being, a predetermined field for indicating whether a coding type has been changed; estimating the kind of change in the coding type by estimating a bit value, which has been used in a bitwise logical operation, based on the fact that the value of the indicator field of the current frame is obtained by performing the predetermined bitwise logical operation with respect to the value of the indicator field of the previous frame and the bit value, which is determined according to the kind of change in a coding type; and determining a decoding type for the current frame referring to a corresponding field of the previous frame, based on the estimated kind of change in the coding type.

To achieve yet another objective, there is provided a digital video coding device including a coding type change identification unit for identifying how a coding type is changed between a previous frame and a current frame and outputting bits for indicating a state of the change, and an indicator field determination unit for performing a predetermined bitwise logical operation with respect to a value of an indicator field of the previous frame and the bits, which are determined according to the kind of the identified change in a coding type, and determining a result value of the logical operation as a value of an indicator field of the current frame, each indicator field being a predetermined field for indicating whether a coding type has been changed.

To achieve still yet another objective, there is provided a digital video decoding device including a comparator for comparing an indicator field of a previous frame and an indicator field of a current frame in the input bit stream, each indicator field being a predetermined field for indicating whether a coding type has been changed; a coding type change estimator for estimating the kind of change in the coding type by estimating a bit value, which has been used in a bitwise logical operation, based on the fact that the value of the indicator field of the current frame is obtained by performing the predetermined bitwise logical operation with respect to the value of the indicator field of the previous frame and the bit value, which is determined according to the kind of change in a coding type, and for outputting a coding type change indication signal for indicating the kind of change in the coding type; and a decoding type determination unit for determining a decoding type for the current frame referring to a corresponding field of the previous frame, based on the estimated kind of change in the is coding type.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF THE INVENTION

Data transmission protocols and preferred embodiments of devices subject to the protocols according to the present invention will now be described in detail with reference to the accompanying drawings.

Figure 1:
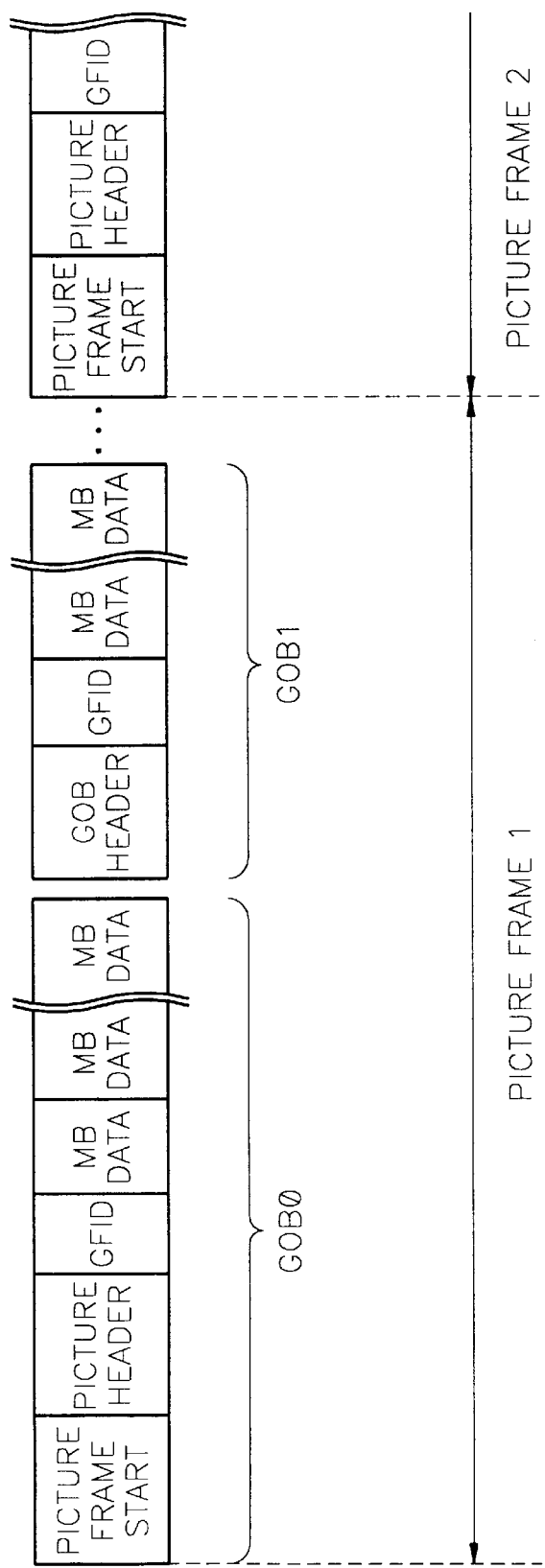
FIG. 1 shows the format of a field defined by an H.263 standard to explain a conventional video coding method.
Figure 2:
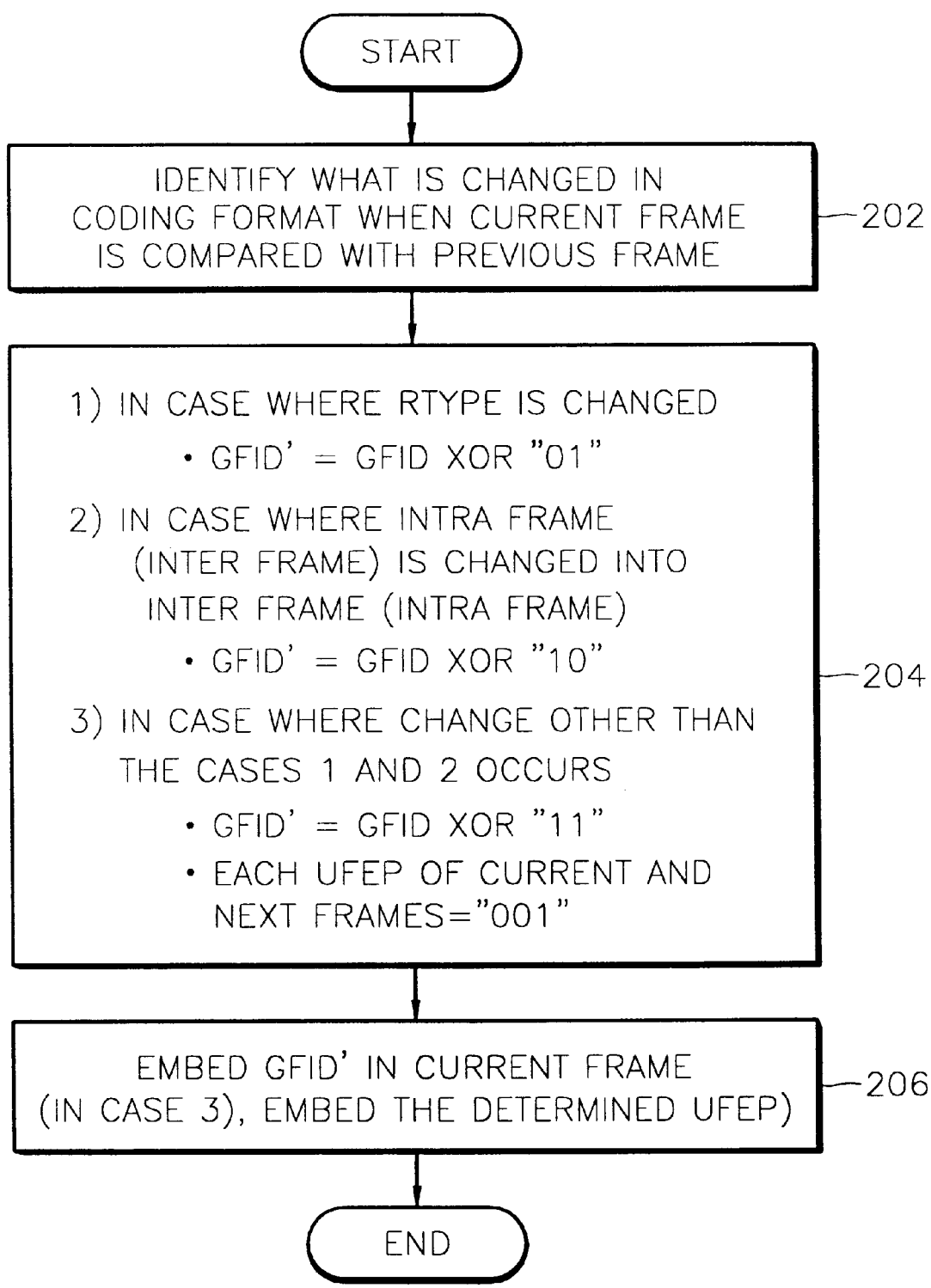
FIG. 2 is a flow chart showing the main steps of a digital video coding method according to the present invention.

Referring to FIG. 2, in a digital video coding method according to an embodiment of the present invention, it is identified what is changed in a coding type when a current frame is compared with a previous frame in step 202.

Next, a value of a group-of-block frame identifier (GFID) field is determined by performing a predetermined bitwise logical operation using a value of the GFID field of the previous frame and a bit value which is determined according to the kind of change in the coding type, in step 204. In this embodiment of the present invention, as the predetermined bitwise logical operation, an exclusive OR operation is used.

As a first case, there occurs a rounding type (hereinafter, named RTYPE) change. Generally, as chrominance decreases, a red color component remarkably increases. To remove this phenomenon, bits of the RTYPE are set to "1" and "0", alternately, in a picture header. This RTYPE change most frequently occurs in a coding method according to the H.263 standard. According to the embodiment of the present invention, when the RTYPE change occurs, the value of the GFID field of the current frame is determined according to GFID'=GFID XOR "01", wherein "GFID'" indicates the value of the GFID field of the current frame and "XOR" indicates the exclusive OR operation. As a second case, there occurs a change from an intra frame to an inter frame or a change from an inter frame to an intra frame. In this case, the value of the GFID field of the current frame is determined according to GFID'=GFID XOR "10". As a third case, there occurs a change which belongs to neither the first case nor the second case. In this case, the value of the GFID field of the current frame is determined according to GFID'= GFID XOR "11". For example, change in an annex corresponds to the third case. The annex is a detailed appendix which defines an optional coding method in a digital video coding related standard such as the H.263 standard. In this embodiment, in the third case, the update full extended picture type (UFEP) field of a current frame subject to the change and the UFEP field of a next frame, are set to "001".

Thereafter, a GFID field of the current frame, GFID', is set to a determined value and embedded in the current frame. When the change in a coding type corresponds to the third case, a determined UFEP filed is embedded in the current frame and the next frame in step 206.

As described above, in a digital video coding method according to the present invention, when encoding a current frame, a value of a GFID field of the current frame is determined by performing a bitwise logical operation with respect to a value of a GFID field of a previous frame and a bit value representing information on the kind of change in a coding type, and the determined value is embedded in the current frame. Therefore, even if the picture header of a current picture frame is lost, the kind of change in a coding type can be estimated based on the values of GFID fields of the current and previous frames during decoding. Consequently, decoding can be performed using accurate picture header information.

Figure 3:
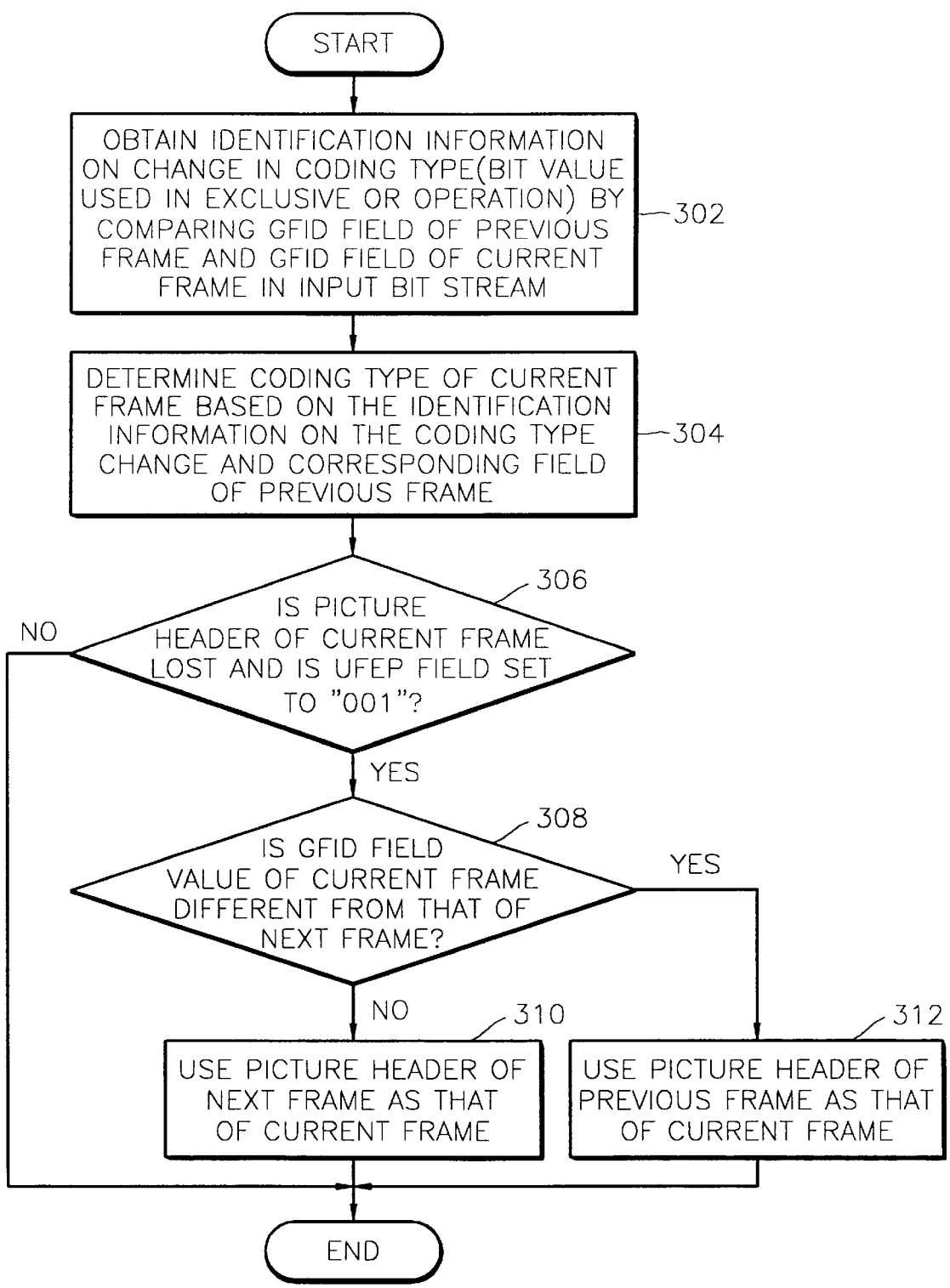
FIG. 3 is a flow chart showing the main steps of a digital video decoding method according to the present invention.

The following description concerns a digital video decoding method for decoding a bit stream which has been coded according to the digital video coding method as described above according to the present invention. Referring to FIG. 3, the GFID field of a previous frame is compared with the GFID field of a current frame in an input bit stream, and identification information (a bit value which was used in an exclusive OR operation) on the change in a coding type is obtained in step 302.

Next, a coding type of the current frame is determined based on the identification information on the coding type change and a corresponding field in the previous frame in step 304. For example, when the RTYPE field and the GFID field in the previous frame are set to "0" and "00", respectively, and the RTYPE field of the current frame is set to "1", the GFID field of the current frame is determined to be set to "01". It can be estimated that XY, which is a bit value determined according to the kind of change in a coding type, is set to "01" from the equation "01"="00" XOR XY and that the RTYPE in the current frame has been changed. In other words, when the RTYPE of the previous frame is set to "0", the RTYPE of the current frame is set to "1".

Similarly, when the previous frame is I-frame and the current frame is P-frame, if the GFID of the previous frame is set to "00", the GFID of the current frame is estimated to be set to "10". In this case, since the GFID of the previous frame is set to "00" and the GFID of the current frame is set to "10" during the decoding, it can be estimated that a bit value "10" is used in the exclusive OR operation of the value "00". Accordingly, it can be determined that the current frame is a P-frame which is different from the previous I-frame.

Alternatively, in a case in which an H.263 annex is changed in a current frame, for example, it can be estimated that a bit value "11" is used in the exclusive OR operation of a value "00" based on a value "00" of the GFID field of a previous frame and a value "11" of the GFID field of the current frame. Accordingly, it can be determined that the current frame has the annex change which is the coding type change corresponding to the bit value "11", as compared with the previous frame.

As described above, in a digital video decoding method according to the present invention, the change between the GFID of a current frame and the GFID of a previous frame is identified and the change in a coding type can be estimated from the values of the GFID fields of the current and previous frames. Referring to the estimated information on the coding type change, a decoding type for the current frame can be accurately determined. In other words, in the digital decoding method according to the present invention, based on the fact that the value of the GFID field of the current frame is obtained by performing a predetermined bitwise logical operation with respect to the value of the GFID field of the previous frame and a bit value, which is determined according to the kind of the coding type change, the bit value, which is used in the bitwise logical operation, is estimated. Therefore, even if the picture header of the current picture frame is lost, the change in the coding type can be estimated referring to only the values of the GFID field of the previous and current frames. In addition, based on the estimated change in the coding type, the decoding type for the current frame can be accurately determined referring to a corresponding field in the previous frame, thereby removing degradation of picture quality which may be caused by discarding a bit stream or using the picture header information of the previous frame during decoding, even if the picture header information of the current frame is lost.

Thereafter, according to the digital video decoding method of the present invention, it is determined whether the picture header information of the current frame is lost and the UFEP field of the current frame is set to "001" in step 306. If it is determined that the picture header information is lost and the UFEP is set to "001", it is checked whether the value of the GFID field of the current frame is different from that of a next frame in step 308. If it is determined that the value of the GFID field of the current frame is not different from the value of the GFID field of the next frame, the picture header information of the next frame is used as the picture header information of the current frame in step 310. If it is determined that the value of the GFID field of the current frame is different from that of the next frame, the picture header information of the previous frame is used as the picture header information of the current frame in step 312 to decode the current frame, or the current frame is discarded.

In other words, according to the digital video coding method of the present invention as described above, when an input bit stream to be decoded includes an annex change as the change in a coding type, as well as a UFEP field of the current frame of which a coding type is changed with respect to the previous frame, the UFEP field of the next frame is set to "001". If the GFID of the current frame is the same as that of the next frame, this means that there is no change in a coding type. In this case, when decoding the next frame, the picture header of the current frame can be used for the decoding. Hence, the present invention removes the problem of a digital video coding algorithm according to the conventional H.263 standard, that is, if the UFEP field of a frame is set to "001" and the picture header information of the frame is lost, during decoding, frames cannot be normally decoded until a frame including a change is found.

As described above, in a digital video decoding method for decoding a bit stream which has been coded according to the digital video coding method of the present invention, even if the picture header of a current frame is lost, what is changed between the current frame and a previous frame can be estimated from the logical relation between the value of the GFID field of the current frame and the value of the GFID field of the previous frame so that decoding can be normally performed using accurate picture header information. Consequently, decoding performance is improved.

The digital video coding and decoding methods can be made into computer programs for performing those methods. The programs include functional codes and code segments and are easily anticipated by programmers in the art. The digital video coding and decoding methods can be implemented in a common digital computer which can read the programs from a medium used in computers and execute the programs. The program can be stored in a recording medium which can be read by computers. The recording medium covers a magnetic recording medium such as a floppy disk or a hard disk and an optical recording medium such as a CD-ROM or a DVD. The program can be transmitted over carrier wave such as the internet.

Alternatively, the program can be stored in, for example, a built-in flash ROM of a device, read by a micro computer provided in the device and executed, thereby implementing a digital video coding device or a digital video decoding device.

Figure 4:
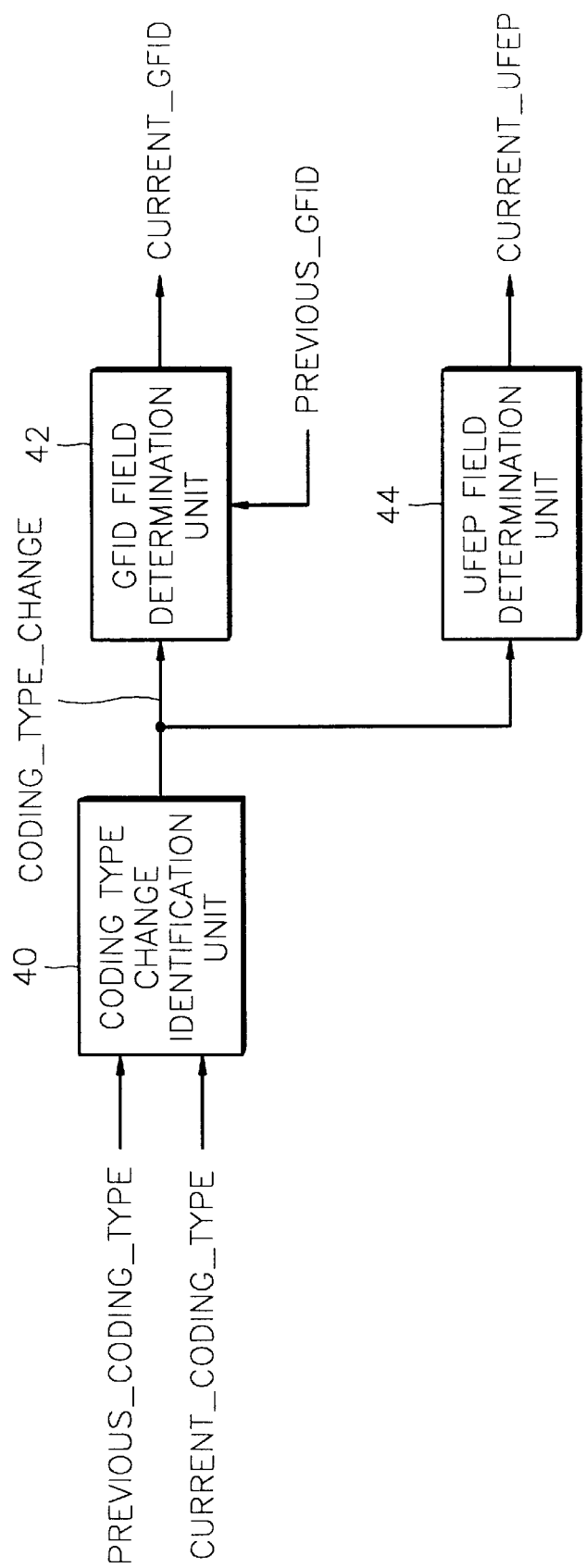
FIG. 4 is a block diagram of a digital video coding device according to the present invention.

FIG. 4 is a block diagram of a digital video coding device according to the present invention. Referring to FIG. 4, the digital video coding device includes a coding type change identification unit 40, a GFID field determination unit 42 and an UFEP field determination unit 44.

The coding type change identification unit 40 receives coding type information of a previous frame, PREVIOUS_CODING_TYPE, and coding type information of a current frame, CURRENT_CODING_TYPE, and identifies the change in a coding type with respect to the previous and current frames so as to output bits CODING_TYPE_CHANGE indicating the state of the change. The bit value CODING_TYPE_CHANGE is set to "00" when an RTYPE changes, to "01" when the change is from an intra frame to an inter frame or vice versa, and to "11" when a change other than these two cases occurs. The change other than these two cases is, for example, change in an annex which is a detailed appendix defining an optional coding method in view of a digital video coding related standard. The GFID field determination unit 42 performs an exclusive OR operation with respect to a value of the GFID field of the previous frame, PREVIOUS_GFID, which is defined by the H.263 standard, and the bits CODING_TYPE_CHANGE which are output from the coding type change identification unit 40 to determine and output a value of the GFID field of the current frame, CURRENT_GFID.

The UFEP field determination unit 44 receives the bit value CODING_TYPE_CHANGE which are output from the coding type change identification unit 40 and indicates the change state of the coding type. If the bits are determined to represent the third case of the coding type change among the cases described above, the UFEP field determination unit 44, with respect to the current frame including the change and a next frame, sets UFEP fields, which are defined by the H.263 standard, to "001".

Hence, the digital video coding device encodes an input video frame and outputs a bit stream including a picture header. The bit stream also includes a GFID field indicating the kind of change in a picture header, that is, how a coding state changes between a previous frame and a current frame. Moreover, if a coding type change falls under the third case like an annex change, the bit stream includes UFEP fields, which are set to a particular bit value, with respect to the current frame and a next frame.

Figure 5:
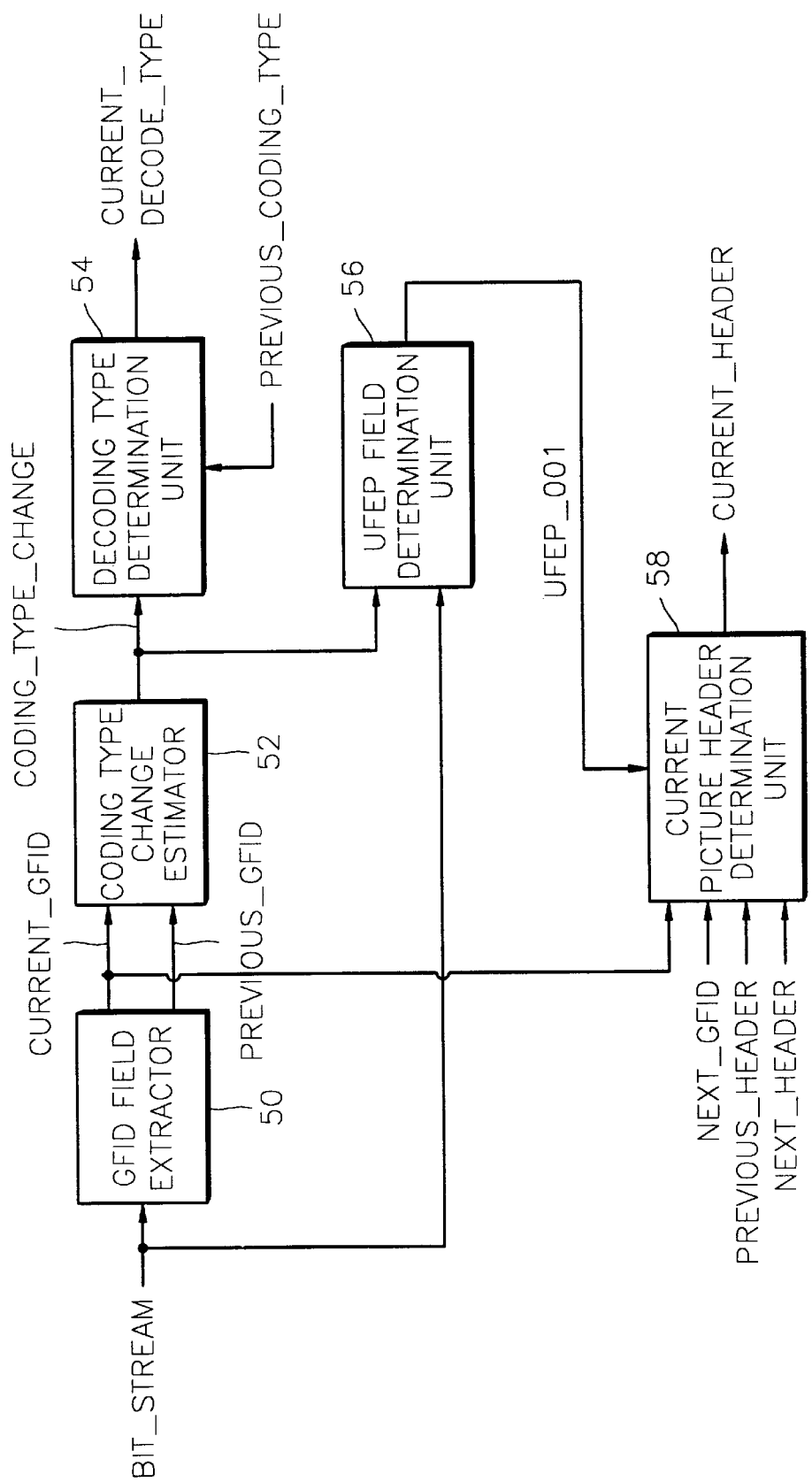
FIG. 5 is a block diagram of a digital video decoding device according to the present invention.

The bit stream coded by the video coding device is decoded by a digital video decoding device of the present invention. FIG. 5 is a block diagram of a digital video decoding device according to an embodiment of the present invention. Referring to FIG. 5, the digital video decoding device includes a GFID field extractor 50, a coding type change estimator 52 and a decoding type determination unit 54. The digital video decoding device also includes an UFEP field state identification unit 56 and a current picture header determination unit 58.

The GFID field extractor 50 extracts the previous frame's GFID field value PREVIOUS_GFID and the current frame's GFID field value CURRENT_GFID.

Based on the fact that the current frame's GFID field value CURRENT_GFID is obtained by performing a predetermined bitwise logical operation with respect to a bit value, which is determined according to the type of the coding method change, and the value of the GFID field of the previous frame, the coding type change estimator 52 determines the bit value, which is used in the bitwise logical operation, and estimates the kind of the coding type change. The coding type change estimator 52 then outputs a coding type change indication signal CODING_TYPE_CHANGE for indicating the change in the coding type.

The decoding type determination unit 54 determines a decoding type for the current frame, CURRENT_DECODING_TYPE, referring to the coding type change indication signal CODING_TYPE_CHANGE for indicating the change in the coding type and a value of a corresponding field of the previous frame, PREVIOUS_CODING_TYPE. The decoding type of the current frame, CURRENT_DECODING_TYPE, is construed to be important to the picture header of the current frame.

In other words, during encoding, a bit stream is designed such is that a bit value, which is used in a bitwise logical operation, is estimated, based on the fact that the value of the GFID field of a current frame is obtained by performing the predetermined bitwise logical operation with respect to the value of the GFID field of a previous frame and the bit value which is determined according to the kind of coding type change, so that the kind of change in a coding type can be estimated only from the values of the GFID fields of the previous and current frames during decoding, even if the picture header of the current frame is lost. In addition, based on the estimated coding type change, a decoding type of the current frame can be properly determined referring to a corresponding field of the previous frame, thereby removing the degradation of picture quality which is caused by discarding a bit stream or using the picture header information of the previous frame when the picture header information of the current frame is lost.

The UFEP field state identification unit 56 identifies whether the UFEP field of the current frame is set to "001", if the picture header information of the current frame is lost, in a case where it is determined that the coding type change indication signal CODING_TYPE_CHANGE indicates the change in an annex, which corresponds to a detailed appendix defining an optional coding method in view of a digital video coding related standard. If it is identified that the UFEP field is set to "001", the UFEP field state identification unit 56 outputs a UFEP identification signal UFEP_001.

In response to the UFEP identification signal UFEP_001, the current picture header determination unit 58 outputs a current picture header indication signal CURRENT_HEADER, which indicates the picture header information of a next frame, NEXT_HEADER, is the picture header information of the current frame, when the current frame's GFID field value CURRENT_GFID is the same as the next frame's GFID field value NEXT_GFID. However, when the current frame's GFID field value CURRENT_GFID is different from the next frame's GFID field value NEXT_GFID, the current picture header determination unit 58 outputs a current picture header indication signal CURRENT_HEADER, which indicates the picture header information of the previous frame, PREVIOUS_HEADER, is the picture header information of the current frame, in response to the UFEP identification signal UFEP_001.

Hence, in a case where an input bit stream to be decoded includes an annex change as a coding type change, UFEP fields are set to "001" in a next frame as well as a current frame for which the coding type has been changed. In addition, if the GFID of the current frame is the same as that of the next frame, this means that change in a coding type has not occurred between the current frame and the next frame. Accordingly, in this condition, the picture header of the current frame can be used when decoding the next frame. Hence, the present invention removes the problem of a digital video coding algorithm according to the conventional H.263 standard, that is, if the UFEP field of a frame is set to "001" and the picture header information of the frame is lost, during decoding, frames cannot be normally decoded until a frame including a change is found.

As described above, in a digital video coding method of the present invention, while encoding a current frame, a value of the GFID field of the current frame is determined by performing a predetermined bitwise logical operation with respect to a value of the GFID field of a previous frame and a bit value indicating information on the kind of change in a coding type and the determined GFID field value of the current frame is embedded in a bit stream. Therefore, even if the picture header of the current frame is lost, the change in a coding type can be estimated from the GFID field values of the current and previous frames during decoding, thereby allowing the decoding to be normally performed using accurate picture header information.

In addition, in a digital video decoding method for decoding a bit stream which has been coded by the digital video coding method according to the present invention, even if the picture header of a current picture frame is lost, change in a coding type can be estimated using the logical relation between a GFID field value of the current frame and a GFID field value of a previous frame, thereby allowing the decoding to be normally performed using accurate picture header information. Consequently, decoding performance is improved.

What is claimed is:

1. A digital video coding method for encoding video frames and outputting a bit stream including picture headers, the digital video coding method comprising the steps of:

(a) identifying what is changed in a coding type between a previous frame and a current frame; and (b) performing a predetermined bitwise logical operation with respect to a value of an indicator field of the previous frame and a bit value, wherein the bit value is determined according to what is changed in the coding type which is identified in the step (a) and the indicator field is a predetermined field for indicating whether the coding type has been changed, and determining a result value of the logical operation as a value of an indicator field of the current frame.

2. The digital video coding method of claim 1, wherein the indicator field is a group-of-block frame identifier (GFID) field which is defined by an H.263 standard.

3. The digital video coding method of claim 1, wherein the bitwise logical operation is an exclusive OR operation.

4. The digital video coding method of claim 1, wherein the bit value has a different value according to a first case in which a rounding type changes, a second case in which an intra frame is changed into an inter frame or an inter frame is changed into an intra frame, and a third case in which a coding type change other than the former two cases occurs.

5. The digital video coding method of claim 4, wherein the third case includes a change in an annex which is a detailed appendix defining an optional coding method in view of a digital video coding related standard.

6. The digital video coding method of claim 5, further comprising the step of setting update full extended picture type (UFEP) fields, which are defined by an H.263 standard, to "001", with respect to the current frame, in which the change in the coding type occurs, and a next frame, when the change in the coding type falls under the third case.

7. The digital video coding method of claim 4, further comprising the step of setting update full extended picture type (UFEP) fields, which are defined by an H.263 standard, to "001", with respect to the current frame, in which the change in the coding type occurs, and a next frame, when the change in the coding type falls under the third case.

8. A digital video decoding method for decoding an input bit stream including a picture header, the digital video decoding method comprising the steps of:

(a) comparing an indicator field of a previous frame and an indicator field of a current frame in the input bit stream, each indicator field being a predetermined field for indicating whether a coding type has been changed;

(b) estimating a change in the coding type by estimating a bit value, which has been used in a bitwise logical operation, based on the fact that the value of the indicator field of the current frame is obtained by performing the predetermined bitwise logical operation with respect to the value of the indicator field of the previous frame and the bit value, which is determined according to the estimated change in the coding type; and (c) determining a decoding type for the current frame referring to a corresponding field of the previous frame, based on the estimated change in the coding type.

9. The digital video decoding method of claim 8, wherein the indicator field is a group-of-block frame identifier (GFID) field which is defined by an H.263 standard.

10. The digital video decoding method of claim 8, further comprising the step of using the picture header information of a next frame as the picture header information of the current frame, when the picture header information of the current frame is lost in a case where it is identified that an update full extended picture type (UFEP) field of the current frame is set to "001" and when the value of the indicator field of the current frame is the same as that of the next frame.

11. A digital video coding device for encoding input video frames and outputting a bit stream including picture headers, the digital video coding device comprising:

a coding type change identification unit for identifying how a coding type is changed between a previous frame and a current frame and outputting bits for indicating a state of the change; and an indicator field determination unit for performing a predetermined bitwise logical operation with respect to a value of an indicator field of the previous frame and the bits, which are determined according to the identified change in the coding type, and determining a result value of the logical operation as a value of an indicator field of the current frame, each indicator field being a predetermined field for indicating whether the coding type has been changed.

12. The digital video coding device of claim 11, wherein the indicator field is a group-of-block frame identifier (GFID) field which is defined by an H.263 standard.

13. The digital video coding device of claim 11, wherein the bitwise logical operation is an exclusive OR operation.

14. The digital video coding device of claim 11, wherein the bits have a different value according to a first case in which a rounding type changes, a second case in which an intra frame is changed into an inter frame or an inter frame is changed into an intra frame, and a third case in which a coding type change other than the former two cases occurs.

15. The digital video coding device of claim 14, wherein the third case includes a change in an annex which is a detailed appendix defining an optional coding method in view of a digital video coding related standard.

16. The digital video coding device of claim 15, further comprising an update full extended picture type (UFEP) field determination unit for setting UFEP fields, which are defined by an H.263 standard, to "001", with respect to the current frame, in which the change in the coding type occurs, and a next frame, when bits indicating that the change in the coding type falls under the third case, is received.

17. The digital video coding device of claim 14, further comprising an update full extended picture type (UFEP) field determination unit for setting UFEP fields, which are defined by an H.263 standard, to "001", with respect to the current frame, in which the change in the coding type occurs, and a next frame, when bits indicating that the change in the coding type falls under the third case, is received.

18. A digital video decoding device for decoding an input bit stream including a picture header, the digital video decoding method comprising:

a comparator for comparing an indicator field of a previous frame and an indicator field of a current frame in the input bit stream, each indicator field being a predetermined field for indicating whether a coding type has been changed;

a coding type change estimator for estimating the change in the coding type by estimating a bit value, which has been used in a bitwise logical operation, based on the fact that the value of the indicator field of the current frame is obtained by performing the predetermined bitwise logical operation with respect to the value of the indicator field of the previous frame and the bit value, which is determined according to the estimated change in the coding type, and for outputting a coding type change indication signal for indicating the estimated change in the coding type; and a decoding type determination unit for determining a decoding type for the current frame referring to a corresponding field of the previous frame, based on the estimated change in the coding type.

19. The digital video decoding device of claim 18, wherein the indicator field is a group-of-block frame identifier (GFID) field which is defined by an H.263 standard.

20. The digital video decoding device of claim 18, further comprising:

an update full extended type (UFEP) field state identification unit for identifying whether an UFEP field of the current frame is set to "001" and outputting an UFEP identification signal for indicating that the UFEP field is set to "001", when the picture header information of the current frame is lost, in a case where the coding type change indication signal indicates a change in an annex which is a detailed appendix defining an optional coding method in view of a digital video coding related standard; and a current picture header determination unit for outputting a current picture header indication signal for indicating that the picture header information of a next frame is the picture header information of the current frame, in response to the UFEP identification signal, when the value of the indicator field of the current frame is the same as that of the next frame.

* * * * *